UNITED STATES PATENT OFFICE.

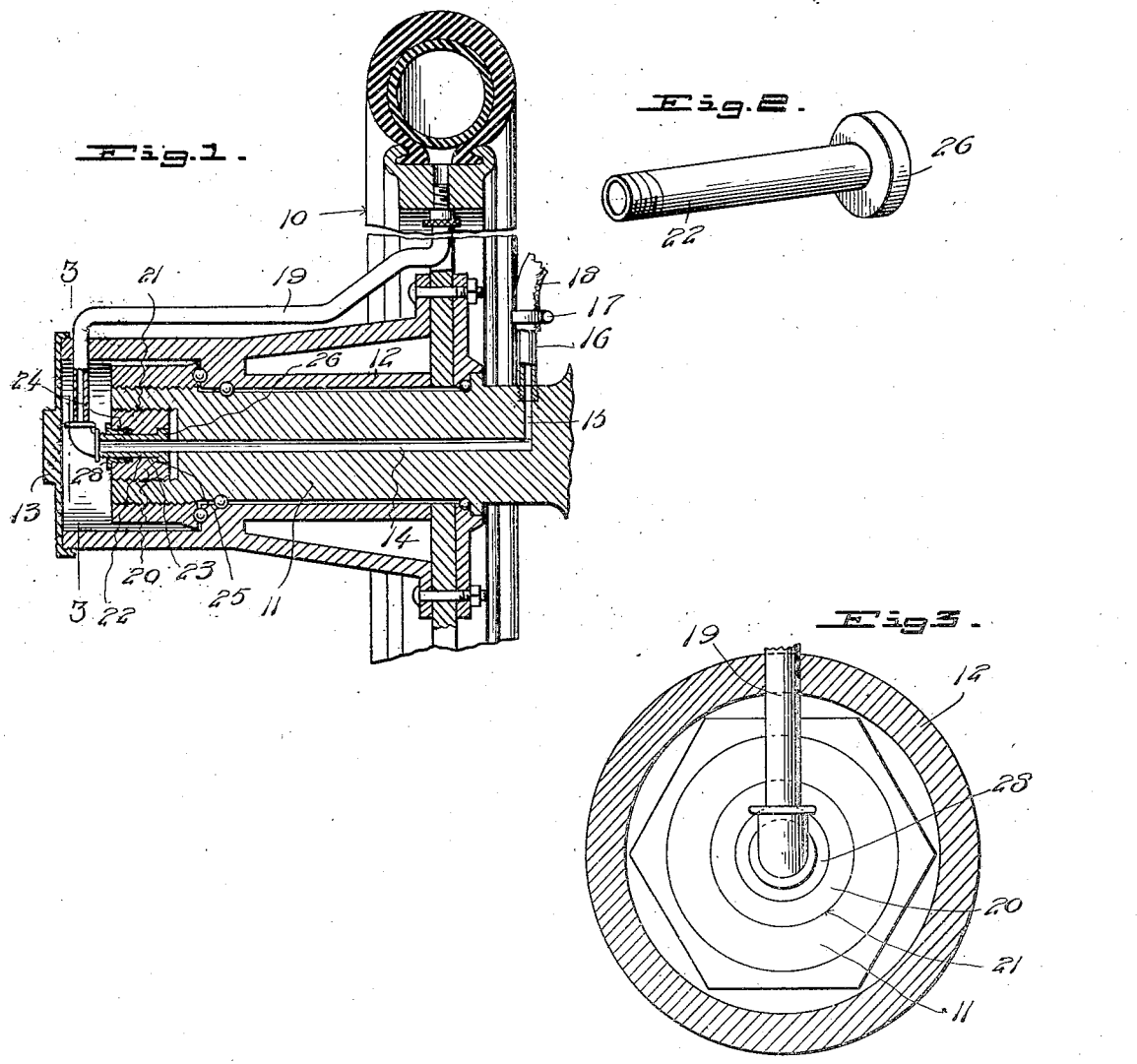

LOUIS BURGGRAF, JR., OF OGLESBY, ILLINOIS.

MEANS FOR TIRE INFLATION.

1,112,596.  Specification of Letters Patent.  Patented Oct. 6, 1914.

Application filed May 28, 1913. Serial No. 770,540.

*To all whom it may concern:*

Be it known that I, LOUIS BURGGRAF, Jr., a citizen of the United States, residing at Oglesby, in the county of La Salle, State of Illinois, have invented certain new and useful Improvements in Means for Tire Inflation; and I do hereby declare the following to be a full, clear, and exact description of the invention, such as will enable others skilled in the art to which it appertains to make and use the same.

This invention relates to new and useful improvements in means for distributing air to pneumatic tires upon self-propelled vehicles and the like either while the car is at rest or while traveling and the primary object of the invention is to improve the construction and simplify the efficiency of apparatuses of the above described character.

This invention is an improvement on my Patent #1,054,504 patented Feb. 25, 1913. In that patent the connections between the rotary and non-rotary elements of the car are disposed wholly within the caps of the hubs. In applying the device to some standard makes of automobiles, a disadvantage is incurred in that the space between the end of the cap and the end of the axle is not sufficient to contain the connection of the rotary and non-rotary elements.

The specific object of this present invention therefore resides in the provision of a connection between the rotary and non-rotary elements which will permit the device to be readily applied to all standard makes of automobiles.

A further object resides in the provision of such a connection, which has its parts so constructed and arranged that they may be readily assembled and disassembled.

With these and other objects in view, the invention resides in the novel combination, formation and arrangement of parts to be more fully hereinafter described and illustrated in the accompanying drawings and particularly pointed out in the claim hereto appended.

Reference is had to the accompanying drawings wherein similar characters of reference designate corresponding parts throughout the several views, and in which:

Figure 1 is a vertical longitudinal sectional view of one of the front wheels of an automobile and the adjacent portion of the body thereof, with the improved connection associated therewith, Fig. 2 is a perspective view of the connecting nipple, and Fig. 3 is a sectional view taken on the line 3—3 of Fig. 1.

Referring now more particularly to the drawings 10 designates one of the front wheels of the vehicle which is secured upon the stub axle 11 by the usual hub portion 12 provided at its outer end with the cap 13. As in my previous patent this axle is provided with a longitudinally extending bore 14 and secured to the inner end of the axle is a short pipe section 15 carrying the nipple 16 to the free end of which is secured by means of the clamp 17 an air supply hose 18. Extending from the tire of the wheel is a pipe 19 having its inner end extended through an opening in the periphery of the hub and adjacent the end thereof, it being observed that there is a slight space between the end of the stub axle and the end of the hub.

The connection between the bore of the pipe 19 and the bore 14 of the stub axle includes a casing 20 threaded into a central socket 21 provided in the outer end of the stub axle. For receiving the non-rotatable nipple 22 the plug is provided with a central bore 23 which is countersunk at each end as at 24 and 25 respectively. To prevent undesired withdrawal of the nipple 22, the same is provided at one end with a head portion 26 rotatably seated in the countersink 25. An air tight connection between the nipple and the plug is effected by means of suitable packing material disposed in the countersink 24 and a packing gland 28 threaded therein. The free end of the nipple is connected to the inner end of the pipe 19.

From the foregoing it is observed that air passes through the supply hose 18 to the pipe 15, from thence to the bore 14 and through the nipple 22 to the pipe 19 connected to the tire. Air may thus be supplied to the tire irrespective of the motion of the wheel.

It is observed that a very simple structure has been provided which is at the same time efficient in use and which has its parts so disposed that they may be readily assembled and disassembled.

It will be understood that various minor changes and modifications may be made within the scope of the appended claim and without in any manner departing from the spirit of the invention.

What is claimed is:

In a means for tire inflation, the combination with an axle having an air supply channel therein and a pneumatic tired wheel on the axle, of the axle being provided in its free end with a socket, a member threaded in the socket and having a bore in alinement with the air passage of the axle, the inner end of the bore being countersunk, a nipple rotatable in the bore of the said member, a head on the nipple seated in the countersunk portion of the bore and a suitable conveying member extending from the other end of the nipple to the periphery of the wheel.

In testimony whereof, I affix my signature, in the presence of two witnesses.

LOUIS BURGGRAF, JR.

Witnesses:
WILLIAM JEGGLE,
JOHN BURGROFF.